United States Patent
Doran

(10) Patent No.: US 8,000,271 B1
(45) Date of Patent: *Aug. 16, 2011

(54) METHOD AND SYSTEM FOR SELECTIVELY OPERATING IN A HALF-DUPLEX MODE OR FULL-DUPLEX MODE IN A PACKET-BASED REAL-TIME MEDIA CONFERENCE

(75) Inventor: Christopher M. Doran, Sunnyvale, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/606,601

(22) Filed: Oct. 27, 2009

Related U.S. Application Data

(63) Continuation of application No. 10/629,381, filed on Jul. 29, 2003, now Pat. No. 7,636,327.

(51) Int. Cl.
*H04L 5/14* (2006.01)
(52) U.S. Cl. ........ 370/276; 370/278; 370/282; 370/285; 370/296; 370/260

(58) Field of Classification Search .................. 370/276, 370/277, 278, 282, 285, 296, 260, 261
See application file for complete search history.

(56) References Cited

U.S. PATENT DOCUMENTS

| | | | | |
|---|---|---|---|---|
| 5,450,618 | A * | 9/1995 | Naddell et al. ............. | 455/553.1 |
| 7,636,327 | B1 * | 12/2009 | Doran ........................... | 370/276 |
| 2004/0190489 | A1 * | 9/2004 | Palaez et al. .................. | 370/351 |
| 2004/0198425 | A1 * | 10/2004 | Mellone et al. ............ | 455/553.1 |
| 2004/0228292 | A1 * | 11/2004 | Edwards ...................... | 370/277 |
| 2005/0031109 | A1 * | 2/2005 | Fernandez et al. ........ | 379/202.01 |

* cited by examiner

*Primary Examiner* — Kwang B Yao
*Assistant Examiner* — Nguyen Ngo

(57) ABSTRACT

A method and system for managing communications in a packet-based real-time media conference. A conference server determines whether a given conference session should operate in half-duplex mode or in full-duplex mode, and the server instructs at least one participating station accordingly. In the half-duplex mode of operation, for instance, a station may engage in an implicit floor control process, in which the station treats an incoming media stream as an implicit floor denial. On the other hand, in the full-duplex mode of operation, a station would not treat an incoming stream as an implicit floor denial.

5 Claims, 12 Drawing Sheets

METHOD AND SYSTEM FOR SELECTIVELY OPERATING IN A HALF-DUPLEX MODE OR FULL-DUPLEX MODE IN A PACKET-BASED REAL-TIME MEDIA CONFERENCE

REFERENCE TO RELATED APPLICATION

This is a continuation of U.S. patent application Ser. No. 10/629,381, filed Jul. 29, 2003, the entirety of which is hereby incorporated by reference.

BACKGROUND

1. Field of the Invention

The present invention relates to network communications and, more particularly, to the management of packet-based real-time media sessions.

2. Description of Related Art

As a general matter, it is known to establish a real-time media conference over a packet-switched network between multiple user stations, each operated by a respective user. A communication server, such as a multipoint conference unit (MCU) for instance, can reside functionally in the network and can operate as a bridging or switching device between the participating stations, to support the conference session.

In practice, a participating station might initiate the conference session by sending to the communication server a session setup message that identifies the other desired participant(s). In response, the server may then seek to connect each of the designated other participants, such as by forwarding the session setup message or sending a new session setup message to each other party. Ultimately, the server would thereby establish a conference leg with each participating station, including the initiating station, and the server would then bridge together the legs so that the users at the stations can confer with each other, exchanging voice, video and/or other media in real-time via the server.

A signaling mechanism such as the well known Session Initiation Protocol (SIP) could be used to initialize the conference and more particularly to set up each conference leg. Further, digitized media could be packetized and carried between each participating station according to a mechanism such as the well known Real-time Transport Protocol (RTP), for instance. The core industry standards for SIP (Internet Engineering Task Force (IETF) Request For Comments (RFC) 2543) and RTP (IETF RFC 1889) are hereby incorporated by reference.

Packet based media conferencing can be advantageously employed to provide an "instant connect" service, where a user of one station can readily initiate a real-time media conference with one or more designated target users at other stations. The initiating user may simply select a target user or group and then press an instant connect button on his or her station, and the user's station would responsively signal to a communication server to initiate a conference between the initiating user and the selected user or group. This sort of service is referred to as "instant connect" because it strives to provide a quick connection between two or more users, in contrast to telephone service where a user dials a telephone number of a party and waits for a circuit connection to be established with that party.

An example of an instant connect service is commonly known as "push-to-talk" (PTT). In a PTT system, some or all of the conference stations are likely to be wireless devices, such as cellular mobile stations, that are equipped to establish wireless packet-data connectivity and to engage in voice-over-packet (VoP) communication. Alternatively, some or all of the stations could be other sorts of devices, such as multimedia personal computers or Ethernet-telephones, that can establish packet data connectivity and engage in VoP communication through landline connections. Further, each station could be equipped with a PTT button or other mechanism that a user can engage in order to initiate a PTT session or to request the floor during an ongoing session.

In practice, a user of a PTT-equipped mobile station might select a target user or group of users from a contact list or other program menu and engage the PTT button to initiate a conference session with that user or group. In response, the mobile station may then send a session initiation message to the communication server, to set up a conference session in the manner described above for instance, and the user could begin talking with the other users. Further, a similar mechanism could be applied to establish real-time media conferences carrying video or other media as well.

A conferencing system could be designed to provide either full-duplex service or half-duplex service. In a full-duplex system, a participating station would be allowed to send and receive media at the same time, so that a user of the station could both talk and listen at once. In order to accommodate full-duplex operation, a communication server would be configured to receive media from multiple stations at once and to output to each station a mixture of the media or some representative subset of the media (e.g., a strongest signal).

In a half-duplex system, on the other hand, a participating station would at any time be allowed to either send media to the server or receive media from the server, but would be precluded from sending and receiving concurrently. In order to accommodate half-duplex operation, a communication server would be configured to apply a floor-control process, according to which the server allows only one station to have the floor at once. Only the station with the floor would be allowed to send media to the server for transmission in turn to each other participating station.

In a typical floor control process, a participant must request permission to "speak" (i.e., to send voice or other media) by sending a "floor-request" message to the server. The server then replies with a message that either grants or denies the floor. Once the server grants the floor to a participant, the server blocks all other participants from speaking (by denying all floor requests) until the speaker sends a "floor-relinquish" message to the server and the server acknowledges. Upon relinquishment of the floor, the server would then send a "floor-relinquished" message to all participants and the participants would acknowledge. Only after this entire sequence has been completed will any other participant be allowed to speak.

Half-duplex operation is particularly advantageous when user stations communicate over wireless links or other links with limited bandwidth. Unfortunately, however, the exchanges of floor control messages that occur during half-duplex operation can introduce delay into the communication process, which is undesirable.

SUMMARY

The present invention provides a mechanism for selectively switching between a half-duplex mode of operation and a full-duplex mode of operation in packet-based real-time media communications. In accordance with an exemplary embodiment of the invention, a communication server may send a signal to each participating station, instructing each station whether to operate in a half-duplex mode or a full-duplex mode. Each station may then operate in the designated mode.

In the half-duplex mode, a station may engage in an implicit floor control process designed to streamline management of the floor by reducing or eliminating the exchange of floor control messages with the server. In particular, when a user requests the floor during a half-duplex session, the station may simply begin streaming media to the server as an implicit floor request. If the floor is currently open, the server may then grant the floor to the requesting station and begin forwarding the media to each other participant. On the other hand, if the floor is not open, the server may simply ignore the incoming media stream.

Further, if the station receives an incoming media stream when the station is sending an outgoing media stream as an implicit floor request, the station may treat the incoming media stream as an implicit denial of the floor. In response, the station may alert the user that the floor has been denied, and the station may disregard the incoming media stream (i.e., not play it out).

In the full-duplex mode, on the other hand, the station would not engage in the implicit floor control process, since floor control would be unnecessary. Thus, if the station receives an incoming media stream when the station is sending an outgoing media stream, the station would not alert the user that the floor has been denied. Rather, the station may conventionally play out the incoming media stream.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Example Network Architecture a. General

Figure 1:
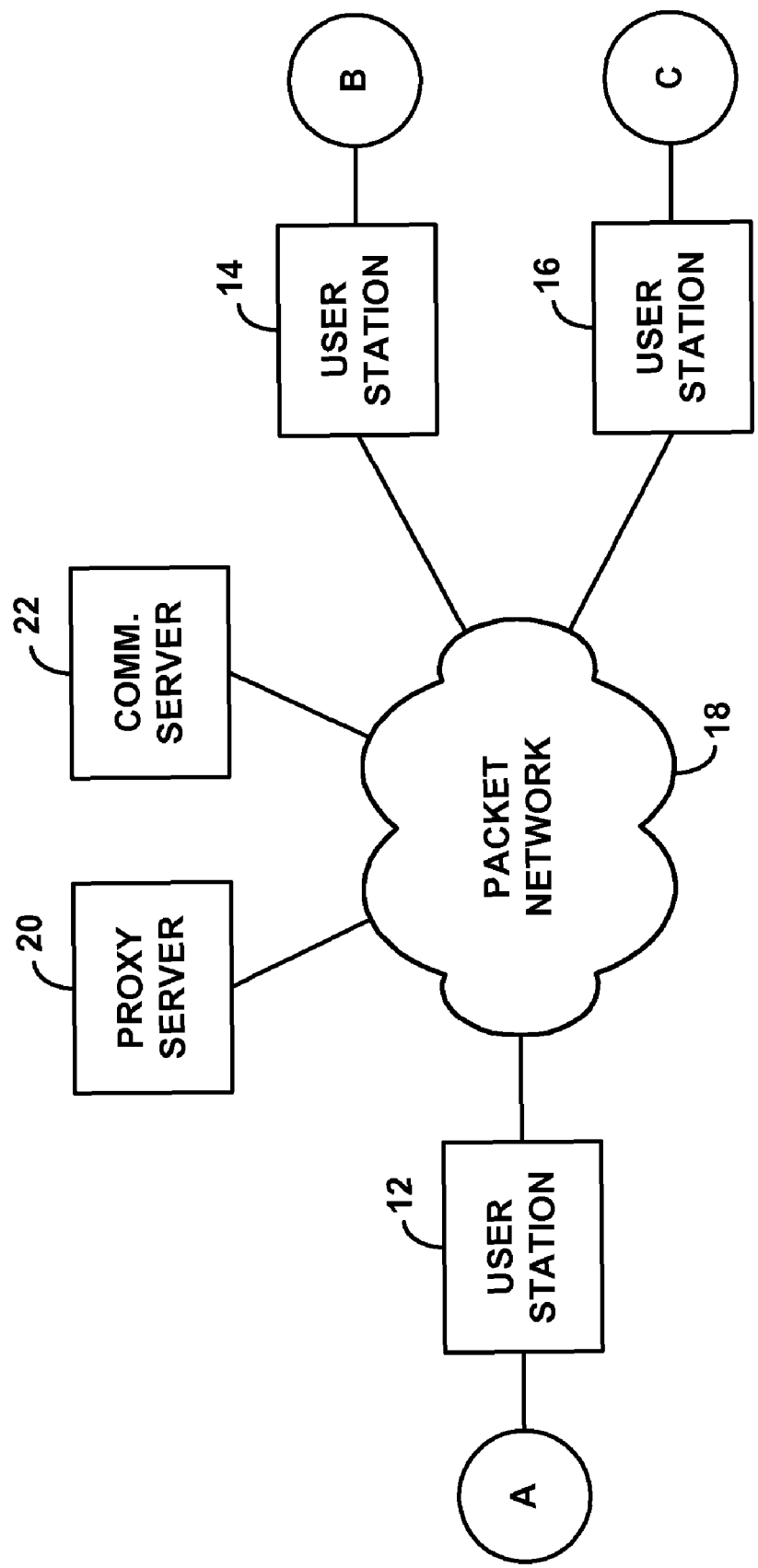
FIG. 1 is a block diagram of a communication system in which the exemplary embodiment can be employed.

Referring to the drawings, FIG. 1 illustrates a communication system 10 in which an exemplary embodiment of the present invention can be employed. For simplicity and by way of example, FIG. 1 depicts three user stations 12, 14, 16 coupled with a common packet-switched network 18. User station 12 is operated by user A, user station 14 is operated by user B, and user station 16 is operated by user C. Sitting on the packet network 18, by way of example, are then a proxy server 20 and a communication server 22.

It should be understood, of course, that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

In the arrangement of FIG. 1, each user station 12, 14, 16 is preferably equipped with hardware and logic to establish network connectivity, to set up and engage in packet-based real-time media conferences via server 22 and to operate in either half-duplex mode or full-duplex mode as instructed by server 22.

Figure 2:
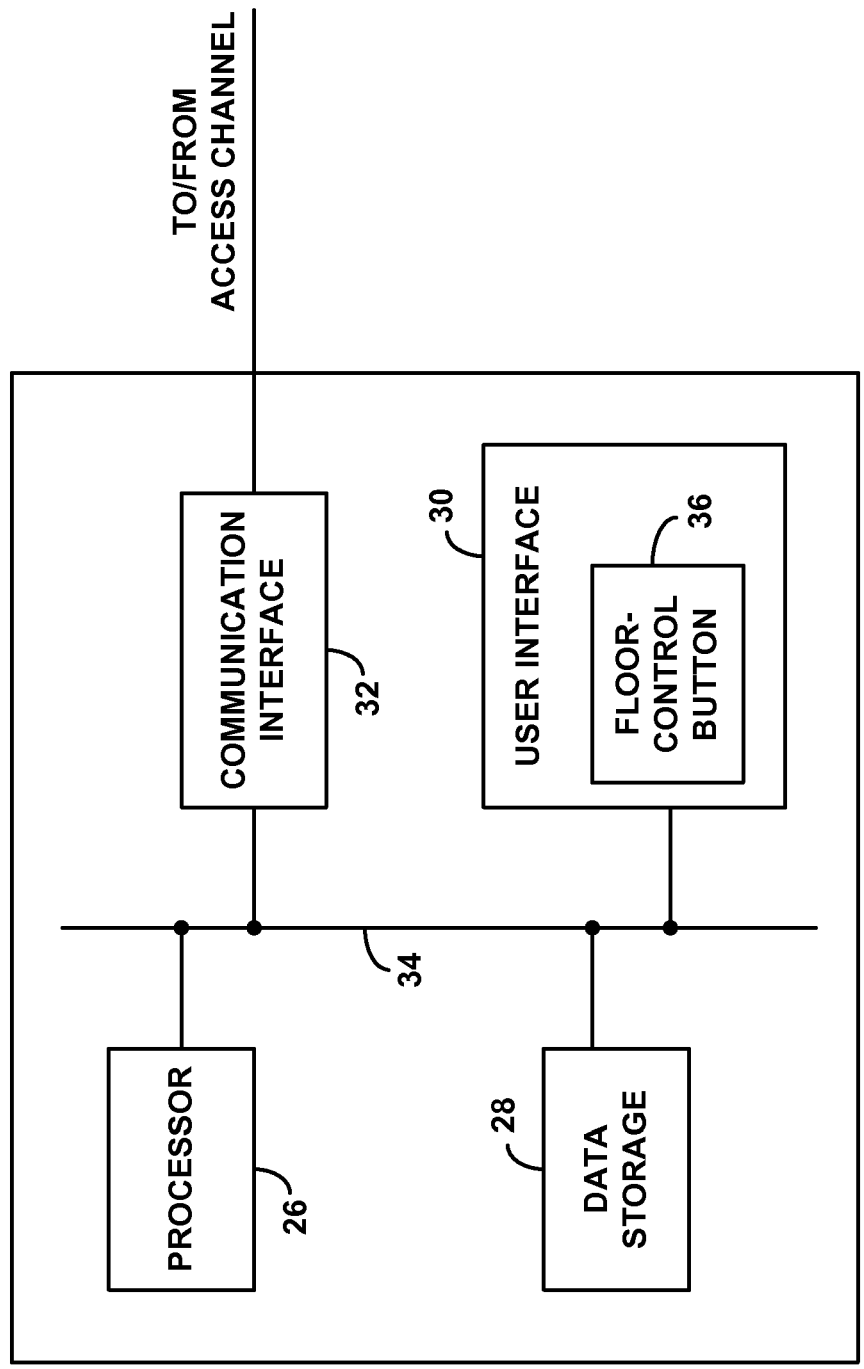
FIG. 2 is a block diagram of an exemplary user station.

FIG. 2 is a block diagram showing some of the components that an exemplary user station could contain in order to carry out these functions. As shown in FIG. 2, the exemplary user station includes a processor 26, data storage 28, a user interface 30, and a communication interface 32, all of which may be coupled together by a system bus or other mechanism 34.

Each of these components may take various forms, the particular details of which are not necessarily critical. For instance, processor 26 may be one or more general purpose microprocessors (e.g., Intel Pentium class processors) or dedicated processors, either of which could integrate part or all of data storage 28. And data storage 28 may be volatile and/or non-volatile storage (such as RAM, flash memory and/or a storage drive).

User interface 30 may facilitate interaction with a user. As such, the user interface may include media input and output mechanisms. To facilitate voice communications, for instance, these mechanisms might include a microphone (not shown) for receiving analog speech signals from a user, and a speaker (not shown) for playing out analog speech signals to a user. (Further, the mobile station will likely include digital/analog conversion circuitry (not shown) for converting between analog media signals and digital representations of those signals.)

In addition, the user interface 30 may include a display, speaker or other mechanism (not shown) for presenting information and menus to a user, as well as an input mechanism (e.g., keyboard, keypad, microphone, mouse, and/or touch-sensitive display overlay) (not shown) for receiving input from a user. To facilitate floor control in the half-duplex mode, the input mechanism may also include a floor-control button 36 or other mechanism that a user can readily engage in order to request the floor in an ongoing session.

Communication interface 32, in turn, facilitates communication through an access channel to packet network 18. The communication interface may thus vary in form depending on the type of connection through which the station will communicate. For instance, if the station is coupled through a wired Ethernet connection to the network, then communication interface 34 might be a conventional Ethernet module. As another example, if the station is coupled through a wireless Ethernet or other radio access link to the network, then the communication interface might include a suitable chipset and antenna for communicating according to a designated air interface protocol.

In the exemplary embodiment, data storage 28 may hold program logic, such as machine language instructions, that can be executed by processor 26 to carry out various functions described herein. (Alternatively or additionally, the exemplary station could include hardware and/or firmware to carry out these functions.)

For example, to facilitate packet-data communications over network 18, the logic may define a conventional IP stack.

As another example, to facilitate setting up and tearing down communication sessions, the logic may define a SIP user agent client application that enables processor 26 to engage in conventional SIP messaging.

As still another example, to facilitate real-time media communication, the logic may define an RTP client application compliant with RFC 1889. And the logic may enable processor 26 to receive media signals from user interface 30 and to encode and packetize outgoing media as RTP/UDP/IP packets for transmission via communication interface 32 for receipt by server 22. Similarly, the logic may enable processor 26 to depacketize and decode incoming media signals provided by communication interface 32 from server 22 and to pass the decoded signals to user interface 30 for playout to a user.

In accordance with the exemplary embodiment, the logic may then further define mechanics for receiving and responding to an instruction signal from server 22 that directs the station to operate in either half-duplex mode or full-duplex mode. Further, data storage 28 may hold a Boolean flag indicating whether a given session is to be half-duplex or full-duplex, and the logic may cause the processor to set or clear that flag in response to the instruction from server 22. Further, the logic may define mechanics for engaging in implicit floor control in the half-duplex mode and for not engaging in implicit floor control in the full-duplex mode.

In terms of implicit floor control, for instance, when a user requests the floor, the logic may cause processor 26 to begin receiving media from the user and sending the media in an outgoing RTP stream to the server 22. And if the processor detects a user floor request at the same time as an incoming RTP stream from server 22, the logic may cause the processor to treat the incoming RTP stream as a floor denial and to notify the user accordingly. Further details of these functions will be described below.

In the exemplary embodiment, each station will default to operating in half-duplex mode and applying implicit floor control, absent an instruction to the contrary from communication server 22.

Communication server 22, in turn, is preferably equipped with hardware and logic to establish network connectivity, to set up and support packet-based real-time media conferences, to select half-duplex or full-duplex operation for a given session, to instruct participating stations accordingly, and to engage in implicit floor control when in the half-duplex mode.

Figure 3:
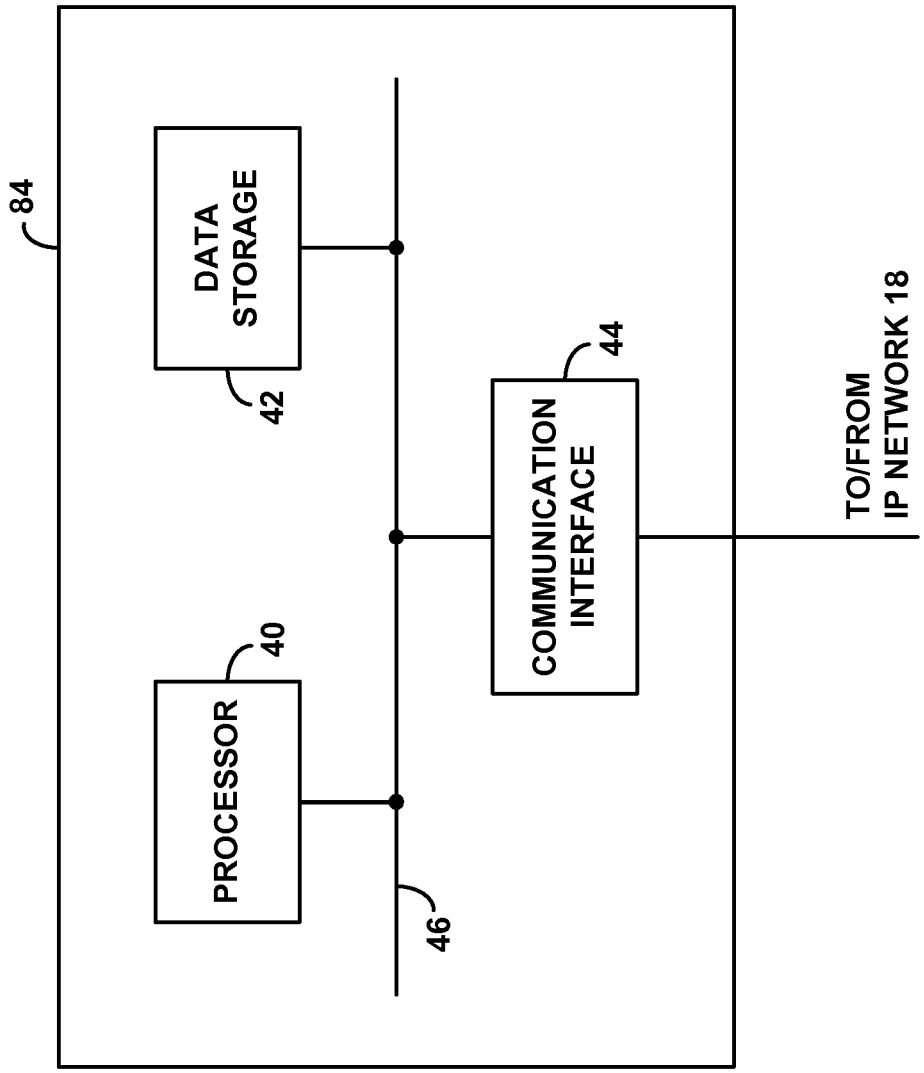
FIG. 3 is a block diagram of an exemplary communication server.

FIG. 3 is a block diagram showing some of the components that an exemplary communication server 22 could contain in order to carry out these functions. As shown in FIG. 3, the exemplary server 22 includes a processor 40, data storage 42, and a communication interface 44, all of which could be coupled together by a system bus or other mechanism 46.

As in the exemplary user station, each of these components may take various forms, the particular details of which are not necessarily critical. For instance, processor 40 may be one or more general purpose microprocessors (e.g., Intel Pentium class processors) or dedicated processors, either of which could integrate part or all of data storage 28. And data storage 42 may be volatile and/or non-volatile storage (such as RAM, flash memory and/or a storage drive).

Communication interface 44 functions to provide connectivity with network 18. Like that in the exemplary user station, communication interface 44 may thus take various forms depending on the form of the link between the server 22 and network 18. By way of example, the communication interface 44 could be a wired or wireless Ethernet module.

Data storage 42, in turn, may hold program logic, such as machine language instructions, that can be executed by processor 40 to carry out various functions described herein. (Alternatively or additionally, the exemplary server 22 could include hardware and/or firmware to carry out these functions.)

Like the exemplary user station, for example, the logic may define a conventional IP stack to facilitate packet-data communications over network 18 and a SIP user agent client application to facilitate SIP messaging. The logic will also preferably define an RTP client application compliant with RFC 1889, as well as functionality to receive and forward RTP media streams.

Further, in the exemplary embodiment, the logic will further define mechanics for deciding whether to operate in a half-duplex mode or a full-duplex mode for a given session. For instance, at the initiation of a session, the logic could cause the processor to select a mode and to send an instruction signal to each participating station indicating the selected mode, and further to operate in the selected mode.

The choice of whether to operate in half-duplex mode or full-duplex mode might depend on user service level (e.g., subscription agreement of the initiating user/station or of the group generally) or on other factors such as date/time or actual measures of network congestion. The logic in data storage 42 may thus cause processor 40 to reference data to facilitate selecting one mode or another. Further, the logic could cause processor 40 to default to half-duplex operation absent any decision to operate in full-duplex mode.

For half-duplex operation, the logic may further define mechanics for granting the floor in response to an implicit floor request from a participating station, and for implicitly denying (i.e., ignoring) a floor request if another participant already has the floor. Additionally, data storage 42 would preferably hold a record of which, if any, station currently holds the floor at any moment. Thus, when server 22 grants the floor to a given station, processor 40 could record in data storage 42 that the station holds the floor.

b. Example Push-to-Talk Architecture

Figure 4:
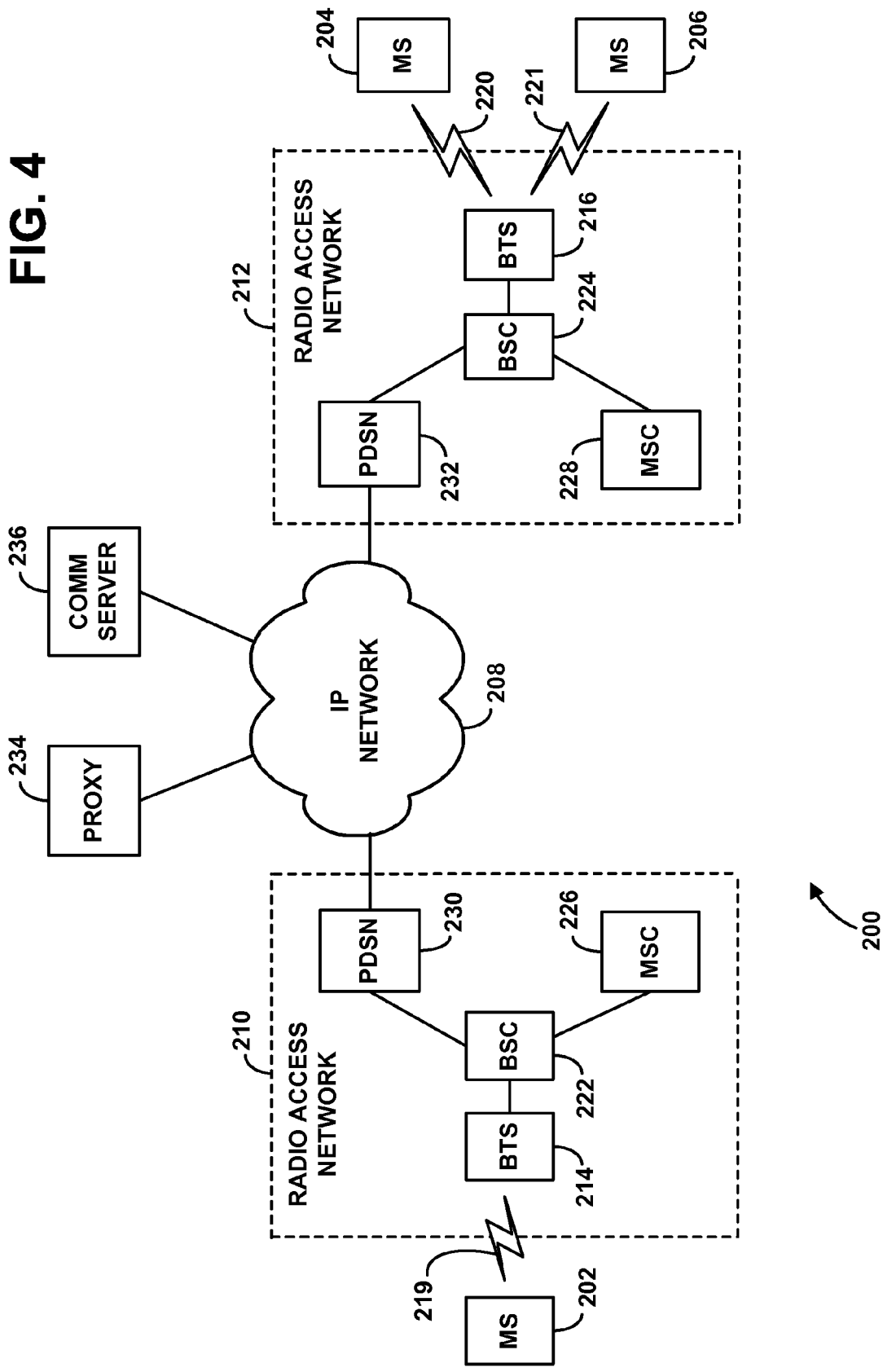
FIG. 4 is a block diagram of a wireless push-to-talk system.

The arrangement shown in FIG. 1 can generally represent any sort of communication system in which multiple stations can engage in packet-based real-time media communication with each other via a communication server. By way of example, FIG. 1 can represent a wireless PTT system, in which some or all of the user stations are wireless devices such as cellular mobile stations for instance. FIG. 4 illustrates the arrangement of such a system 200.

As shown in FIG. 4, the user stations are shown as cellular mobile stations 202, 204, 206. Each mobile station is served by a radio access network with an IP network 208. In particular, mobile station 202 is shown linked by a first radio access network 210 with the IP network, and mobile stations 204, 206 are shown linked by a second radio access network 212 with the IP network. Alternatively, each mobile station can be served by a separate radio access network, or all could be served by a common radio access network.

Each radio access network could take various forms, and the radio access networks may or may not be the same as each other. In the example shown in FIG. 2, both radio access networks have the same configuration. In particular, each radio access network includes a base transceiver station (BTS) 214, 216 that can communicate with mobile stations over an air interface 219, 220, 221. Each BTS is then coupled with a base station controller (BSC) 222, 224, which may in turn be coupled with a mobile switching center (MSC) 226, 228 and with a packet data serving node (PDSN) 230, 232 or other gateway to the IP network 208. Other arrangements are possible as well.

Each mobile station may acquire radio connectivity and IP network connectivity in a manner well known in the art. For instance, applying well known "3G" recommendations, a mobile station may send an origination request over an air interface access channel to its MSC, and the MSC may forward the request back to the BSC. The BSC may then direct the mobile station to operate on a given traffic channel over the air interface. Further, the BSC may forward the request to the PDSN, and the PDSN may work with the mobile station to set up a data link, such as a point-to-point protocol (PPP) session between the mobile station and the PDSN. The PDSN may also assign a mobile-IP address to the mobile station, to allow the mobile station to engage in IP-network communications.

The air interface between each mobile station and its BTS preferably complies with an accepted protocol, examples of which include CDMA, TDMA, GSM and 802.11x. In the exemplary embodiment, for instance, the air interface protocol can be cdma2000, which is published by the 3rd Generation Partnership Project 2. Each mobile station may therefore be a 3G mobile station that is equipped to acquire wireless packet-data connectivity in a manner well known in the art.

Each mobile station is also preferably equipped to engage in SIP and RTP communication like the user stations described above. And each mobile station preferably includes a PTT button and associated logic, to allow a user to request the floor during an ongoing session.

Further illustrated as nodes on IP network 208 are then a proxy server 234 and communication server 236, which are analogous to the proxy server 20 and communication server 22 in FIG. 1.

2. Example Operation a. Session Setup

Figure 5:
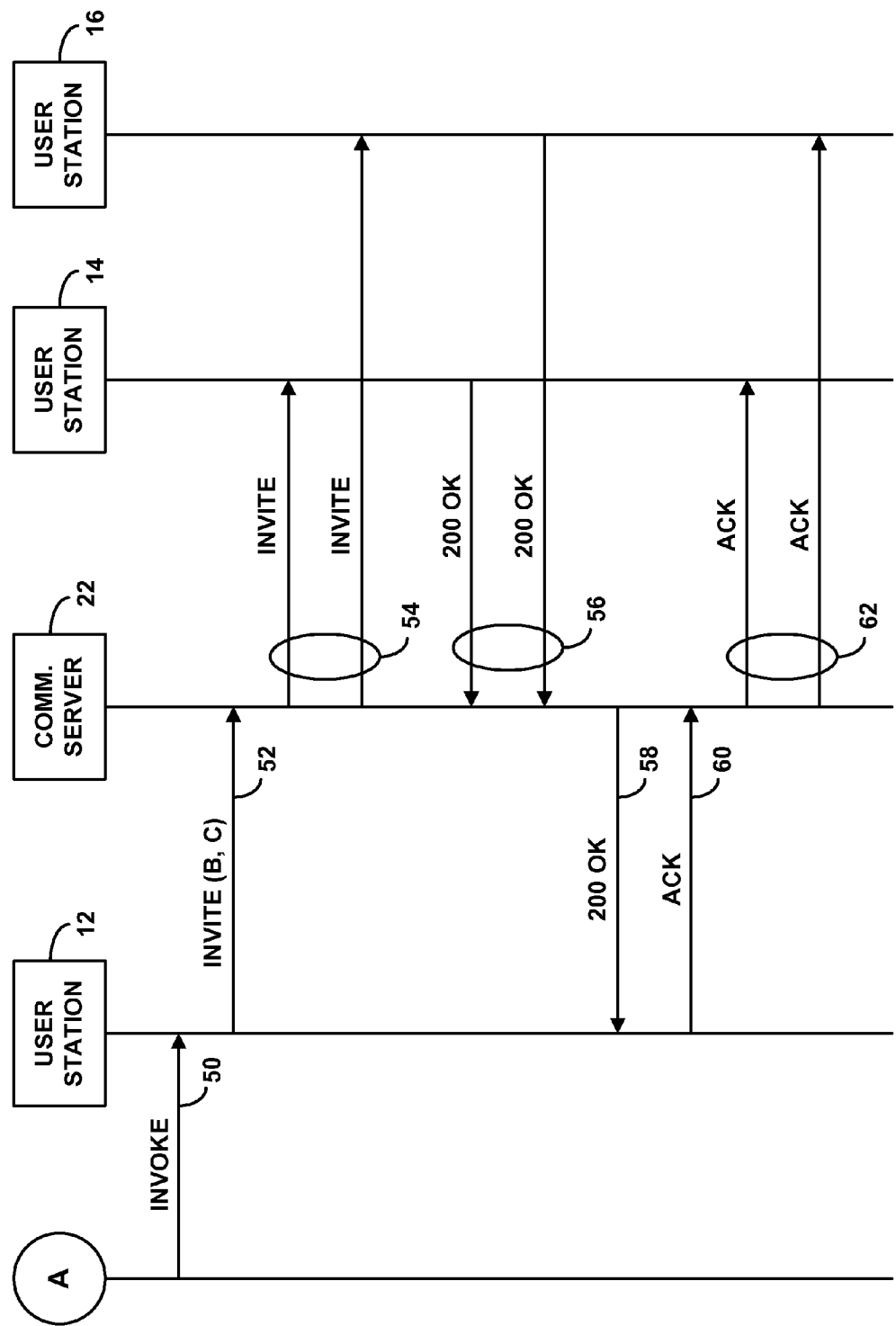
FIG. 5 is a message flow diagram depicting setup of a packet-based real-time media conference.

FIG. 5 is a message flow diagram depicting an example of how a packet-based real-time media session could be set up between stations 12, 14 and 16 in the arrangement of FIG. 1. It should be understood, however, that any other session setup process could be used instead.

As shown in FIG. 5, at step 50, user A directs station 12 to initiate a packet-based real-time media session (e.g., PTT session) with users B and C. For this purpose, the floor-control button 36 on station 12 might also function as a session initiation button. So user A might engage that button.

At step 52, in response to the request from user A, station 12 sends a SIP INVITE to proxy server 20 for transmission in turn to server 22. The INVITE preferably designates users B and C (or stations 14 and 16) or designates a group ID that server 22 can translate into users B and C (or stations 14 and 16).

At step 54, upon receipt of the INVITE, server 22 sends an INVITE to each target participant A and B, in an effort to set up an RTP conference leg with each target participant. At step 56, upon receipt of the INVITE from server 22, each target station signals its agreement to participate, by sending a SIP "200 OK" message to server 22. At step 58, when the server 22 receives those messages, the server signals its agreement to participate by sending a 200 OK to station 12.

At step 60, station 12 then sends a SIP "ACK" message to server 22, to complete signaling for setup of an RTP leg between station 12 and server 22. And at step 62, server 22 then sends an ACK to each target station to complete signaling for setup of an RTP leg between the server 22 and the target station. With the legs thus established, server 22 may then begin bridging communications between the participating stations.

To begin with, station 12 may have the floor as a result of the fact that station 12 initiated the session. To facilitate a discussion of the implicit floor control process, assume that station 12 then relinquishes the floor, through express or implicit signaling with server 22. Thus, a packet-based real-time media session exists between stations 12, 14, 16 via server 22, and implicit floor control may proceed.

b. Signaling Half-Duplex or Full-Duplex Operation

As noted above, server 22 will preferably instruct each of the participating stations whether to operate in half-duplex mode or full-duplex mode. In the exemplary embodiment, the server can do this during session initiation, by including a predefined instruction in the SIP signaling messages that it sends to each station. For instance, when the server sends a 200 OK message to the initiating station, the server may include the instruction as a code or text parameter in the 200 OK message. And when the server sends an ACK message to each target station, the server may include the instruction as a code or text parameter in the ACK message. Each station may be programmed to detect such an instruction when present in a SIP message and to set its mode of operation accordingly.

c. Half-Duplex Operation at a User Station

As explained above, an exemplary user station will be arranged to carry out implicit floor control during half-duplex operation, by sending implicit floor-requests and by detecting and responding to implicit floor denials. FIGS. 6-10 depict examples of these processes, which could be carried out by station 12, 14 or 16 in FIG. 1.

Figure 6:
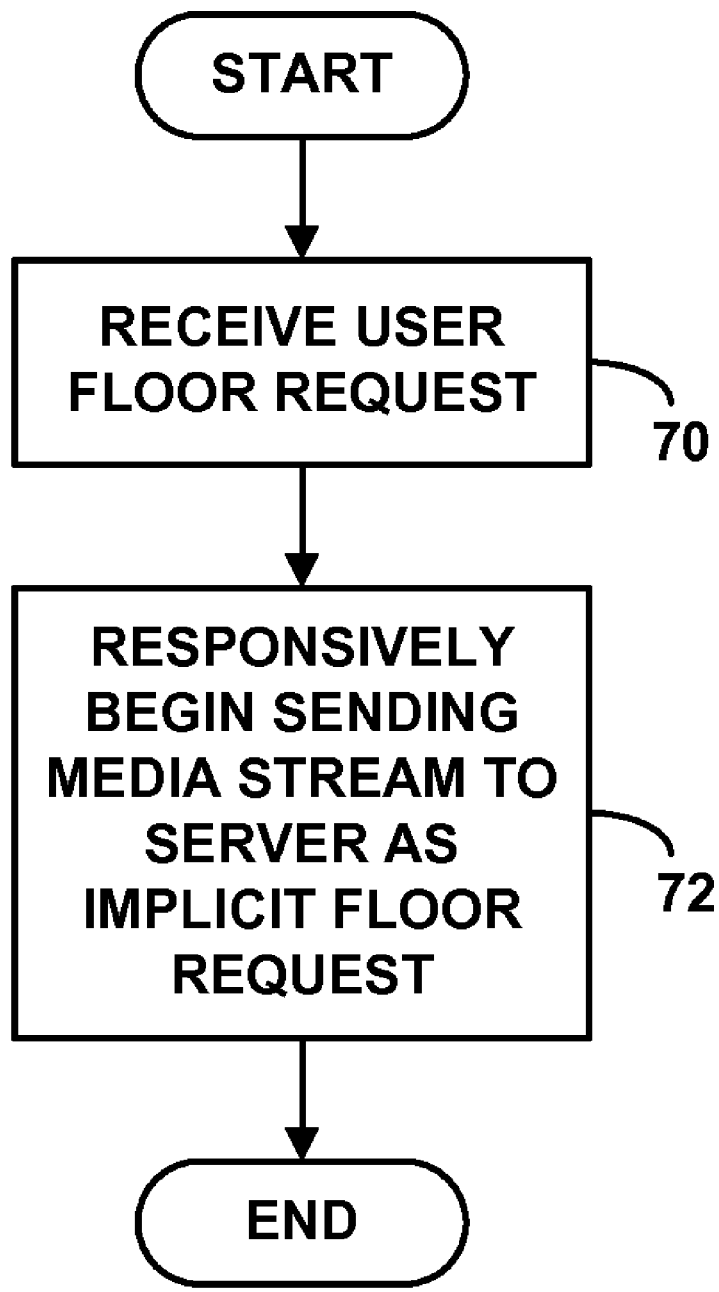
FIGS. 6-10 are flow charts depicting functions that an exemplary user station can carry out in accordance with the exemplary embodiment.

Referring first to FIG. 6, a basic implicit floor request process is shown. At step 70, the station receives a floor-request from a user. For instance, the user may engage in the floor-control button 36 or otherwise interact with user interface 30 to signal a request to begin "talking" (sending voice and/or other media). In response, at step 72, the station begins sending an RTP stream representing media to server 22, as an implicit floor request. For instance, processor 26 may begin receiving voice from the user, digitizing and encoding the voice, and sending a digital representation of the voice in an outgoing RTP stream to server 22.

If the exemplary station is receiving an incoming RTP stream from server 22 at the time the user requests the floor, the station may still carry out the basic process of FIG. 6. Alternatively, in that scenario, the station may consider the incoming RTP stream an implicit denial of the user's floor request. This latter process is illustrated by FIG. 7.

Figure 7:
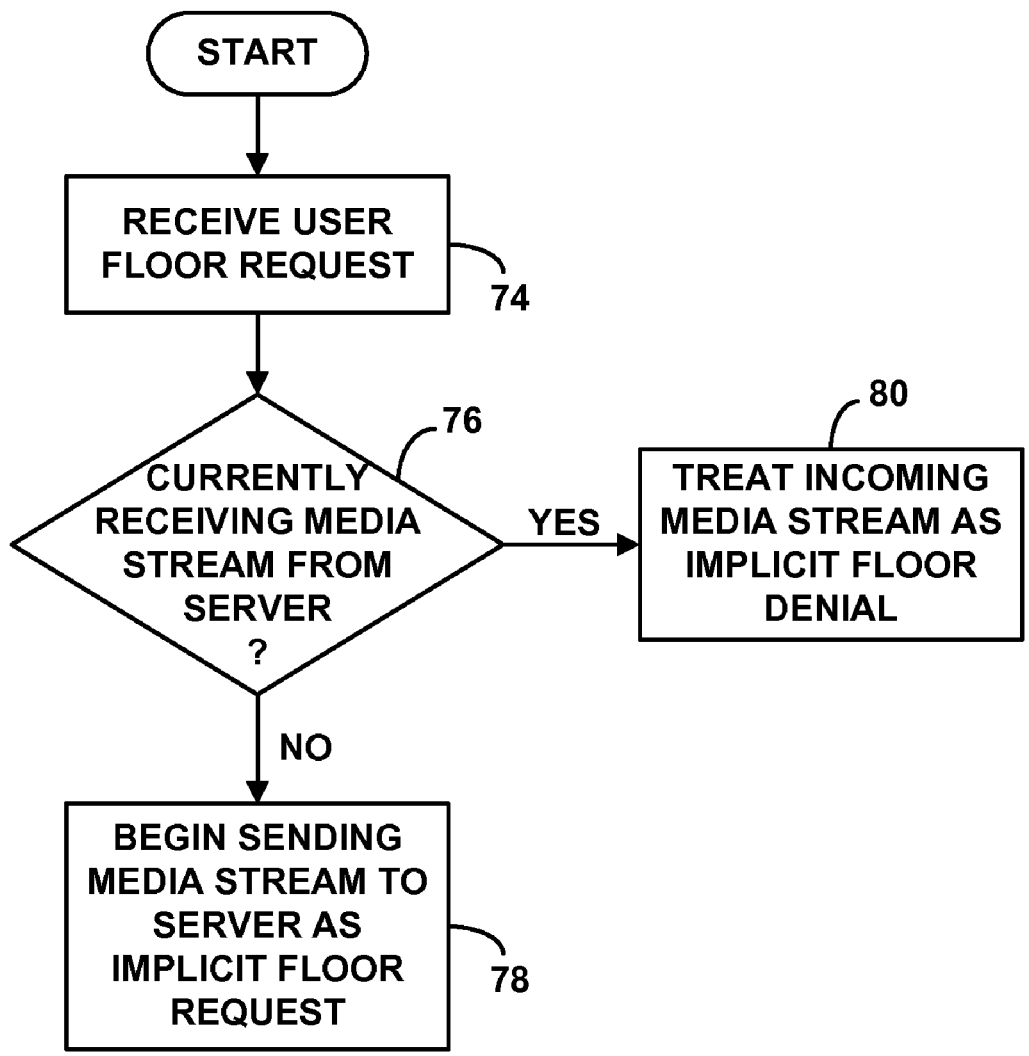

As shown in FIG. 7, at step 74, the station receives a floor request from the user. In response, at step 76, the station determines whether it is currently receiving an incoming RTP stream from the server 22. If it is not receiving an incoming RTP stream from the server, then, at step 78, the station begins sending an RTP stream representing media to server 22. On the other hand, if it is receiving an incoming RTP stream from the server, then, at step 80, it may treat the incoming RTP stream as an implicit floor denial, i.e., as an indication that someone else already has the floor.

Figure 8:
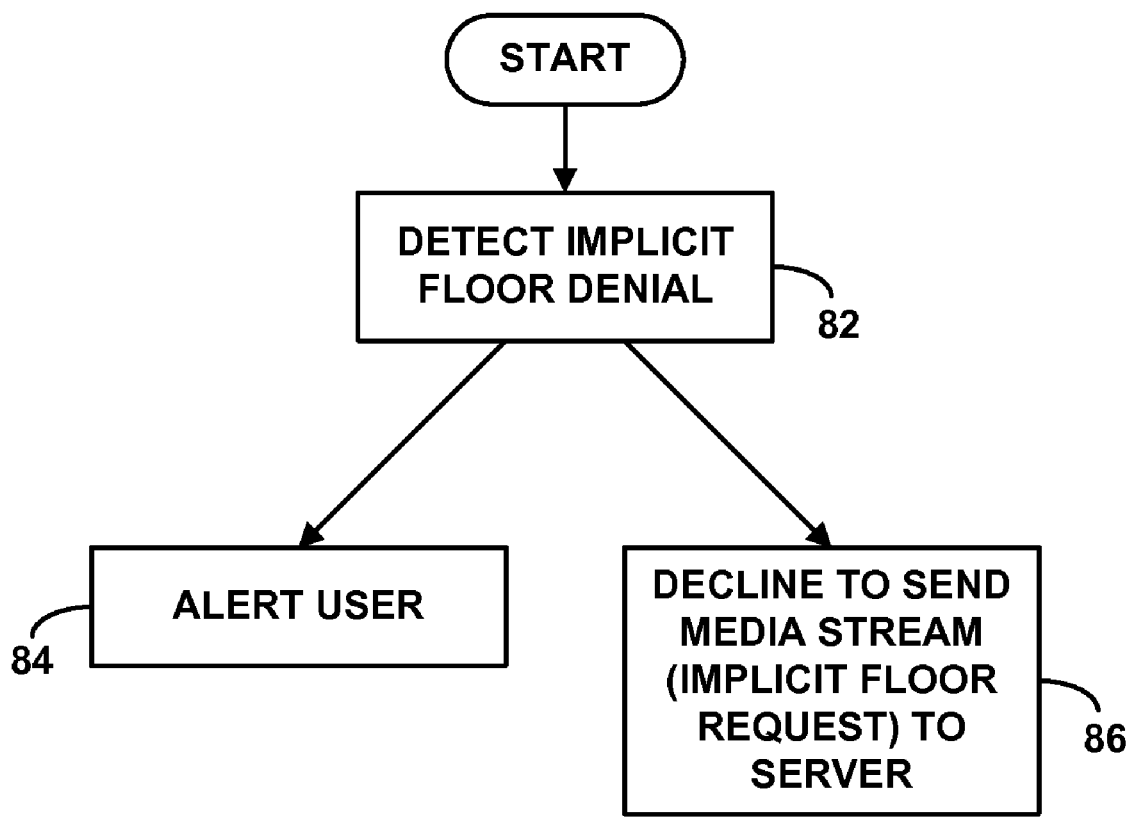

In the exemplary embodiment, when a station detects an implicit floor denial like this, the station can notify the user that the floor has been denied, and the station would preferably decline to send media to the server until the floor is released. FIG. 8 depicts an example of this process, where the station takes both of these actions in response to an implicit floor denial.

As shown in FIG. 8, at step 82, the station first detects an implicit floor denial. In response, at step 84, the station alerts the user who requested the floor, i.e., the station presents a floor denial alert to the user. For instance, the station may notify the user through an audible, visual or vibratory alert via user interface 30. As a specific example, the station may beep and present a display screen message that indicates another participant has the floor. Also in response, at step 86, the station declines to send media to the server, i.e., declines to send an implicit floor request to the server.

Figure 9:
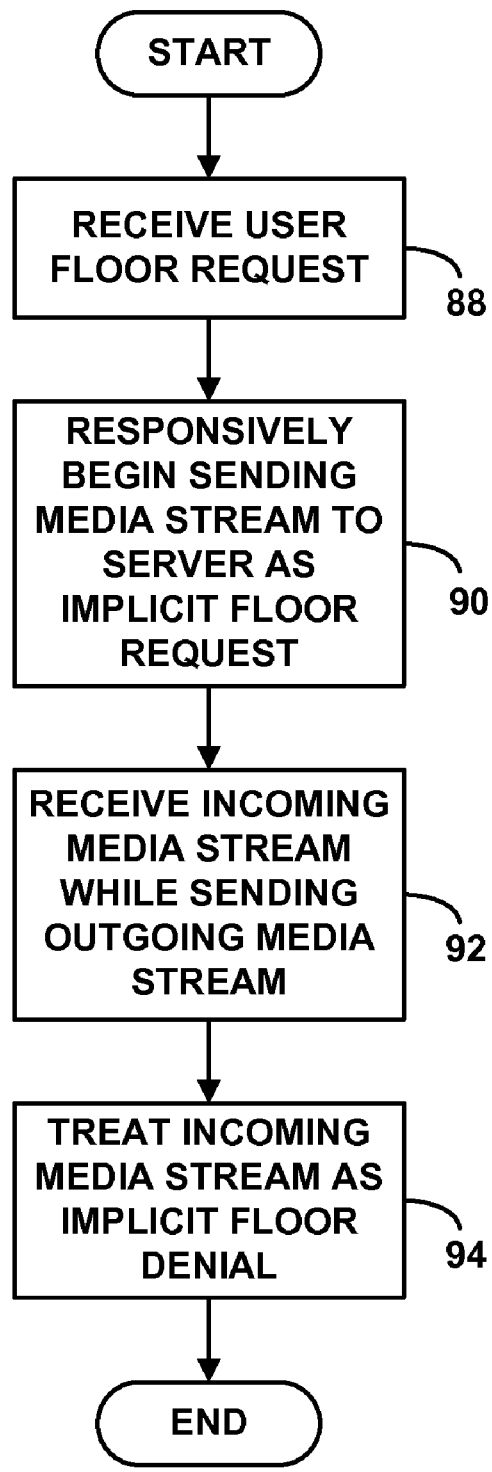

On the other hand, it is also possible that the station could begin receiving an incoming RTP stream from the server 22 while the station is sending media to the server. This could occur in a race scenario, for instance, where a station implicitly requests the floor before starting to receive media that the server just began receiving from another station. In that case, the station will preferably treat the incoming RTP stream as an implicit floor denial. FIG. 9 depicts this process.

As shown in FIG. 9, at step 88, the station receives a floor request from a user. At step 90, as in FIG. 6, the station responsively begins sending an outgoing RTP stream to the server 22. At step 92, while the station is sending the outgoing RTP stream to the server, the station receives an incoming RTP stream to the server. In accordance with the exemplary embodiment, at step 94, the station would treat the incoming RTP stream as an implicit denial of the floor request, i.e., as an indication that someone else already has the floor.

Figure 10:
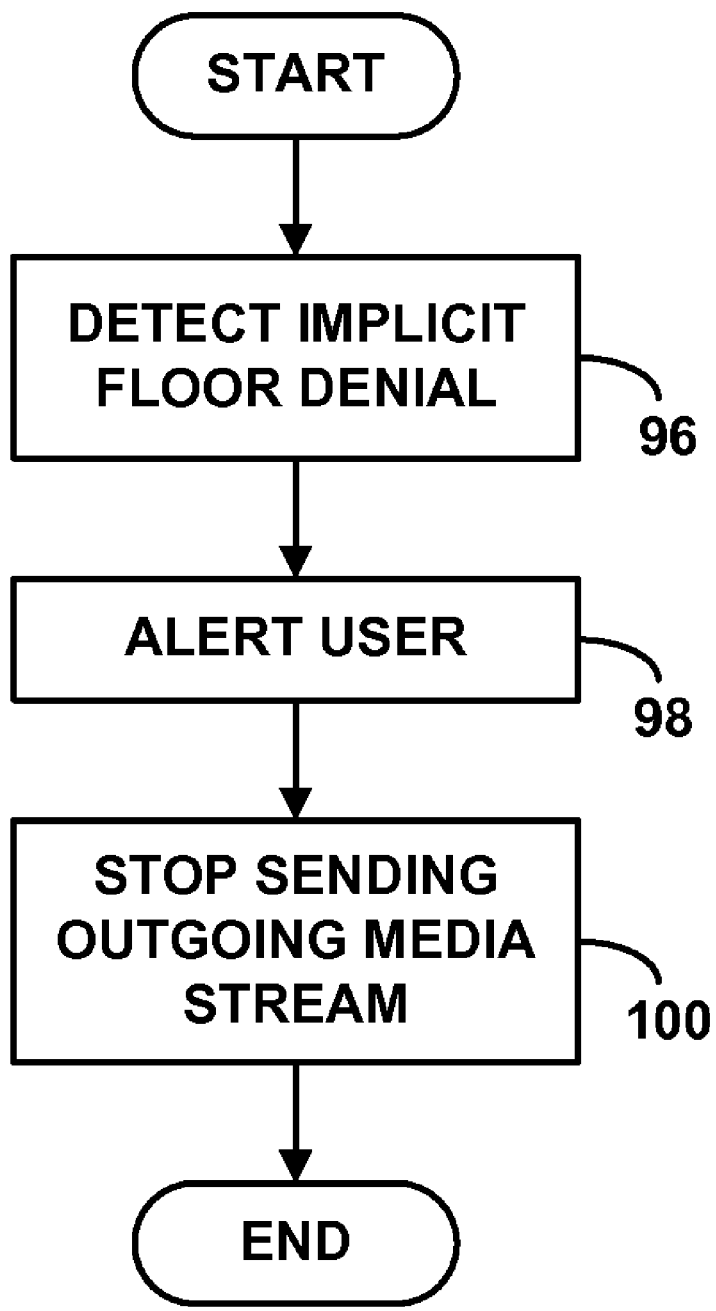

When the station detects an implicit floor denial like this, the station can then notify the user of the floor denial, and the station would preferably stop sending the outgoing RTP stream to the server. FIG. 10 depicts an example of this process, where the station takes both of these actions in response to an implicit floor denial.

As shown in FIG. 10, at step 96, the station detects an implicit floor denial. In response, at step 98, the station alerts the user who requested the floor. Also in response, at step 100, the station stops sending the outgoing RTP stream to the server.

d. Half-Duplex Operation at the Communication Server

Figure 11:
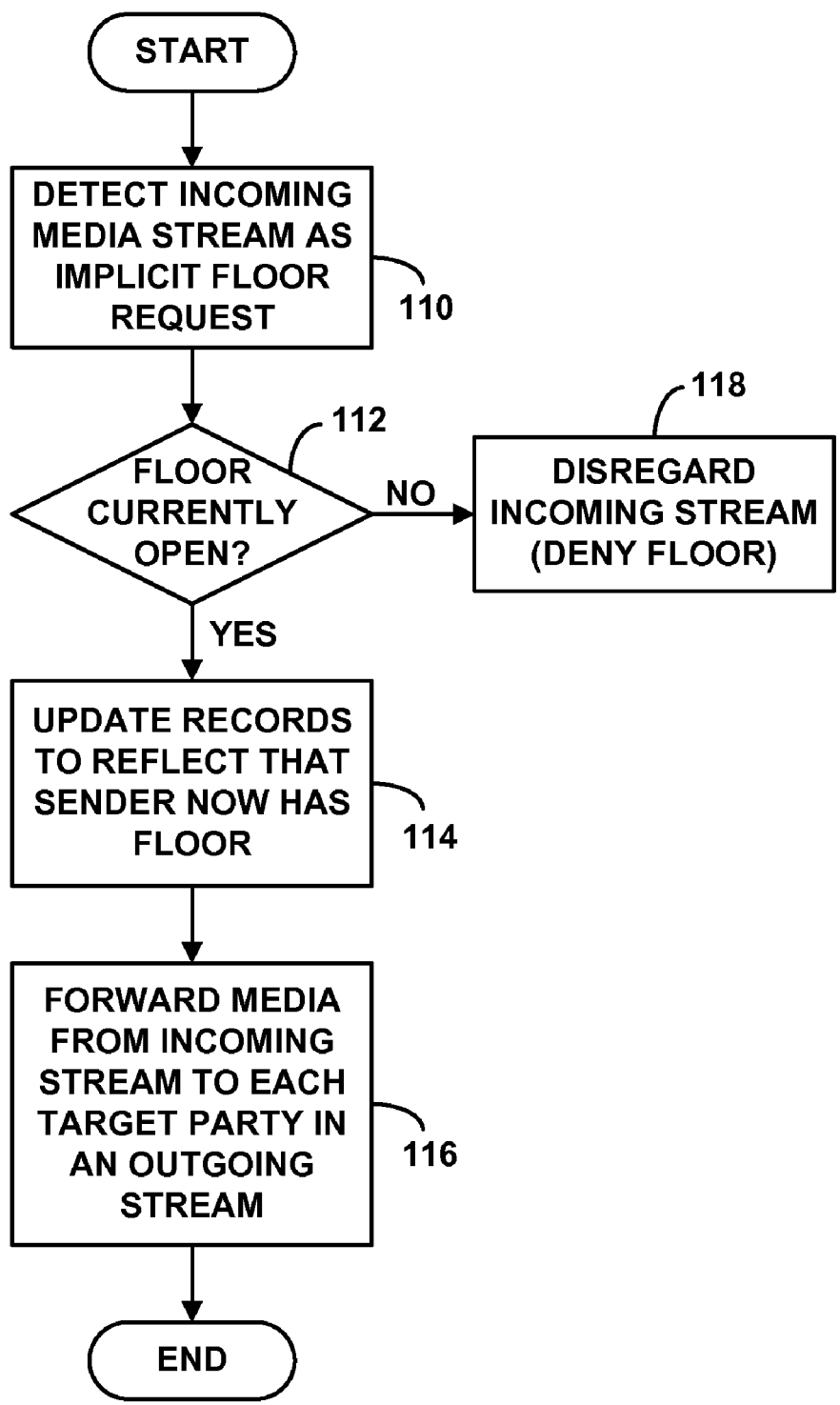
FIG. 11 is a flow chart depicting functions that an exemplary communication server can carry out in accordance with the exemplary embodiment.

As further noted above, the exemplary communication server 22 can be arranged to carry out implicit floor control in the half-duplex mode, by receiving implicit floor requests, granting the floor in response to an implicit floor request when the floor is currently open, and implicitly denying the floor by disregarding an implicit floor request when the floor is not currently open. FIG. 11 depicts an example of this process.

As shown in FIG. 11, at step 110, the exemplary server begins receiving an incoming RTP stream from a user station (such as station 12, 14 or 16), which the server treats as an implicit floor request. In response, at step 112, the server determines whether the floor is currently open. For instance, processor 40 may consult data storage 42 to determine whether any station currently holds the floor.

If the server determines that the floor is currently open, then, at step 114, the server responds to the implicit floor request by assigning the floor to the requesting station (i.e., station and/or user). Further, at step 116, the server also responds by forward the media in the incoming RTP stream to each other participating station in an outgoing RTP stream.

On the other hand, if the server determines that the floor is not currently open, i.e., that another station currently holds the floor, then, at step 118, the server implicitly denies the floor request by ignoring the incoming RTP stream. In other words, the server does not forward the media in the incoming RTP stream to the other participant(s). Optionally, the server may also send an express floor-denial message to the requesting station.

e. Full-Duplex Operation

In a full-duplex system, as noted above, a user station should be able to send and receive media streams (e.g., RTP streams) concurrently. Consequently, if a user station receives an incoming RTP stream when it is sending an outgoing RTP stream, the user station should not treat the incoming RTP stream as an implicit floor denial. Further, if a user station receives a user request to take the floor when the station is receiving an incoming RTP stream, the station should also not treat the incoming stream as an implicit floor denial. Thus, the station would not alert the user that the floor is denied.

The communication server would also behave differently in a full-duplex system. In particular, as noted above, the communication server would be able to receive incoming RTP streams from multiple stations at once and send an outgoing RTP stream to each participating station. The outgoing RTP stream could carry a combination of the media from the incoming RTP streams. (For instance, the server could extract the media from the incoming streams, mix it together and produce outgoing media, and send the outgoing media in an outgoing RTP stream.) Alternatively, the outgoing RTP stream could be selected media, such as the strongest incoming media for instance. Further, in a full duplex system, the server would not need to apply a floor control process.

f. Selective Operation in Half-Duplex Mode or Full-Duplex Mode

Figure 12:
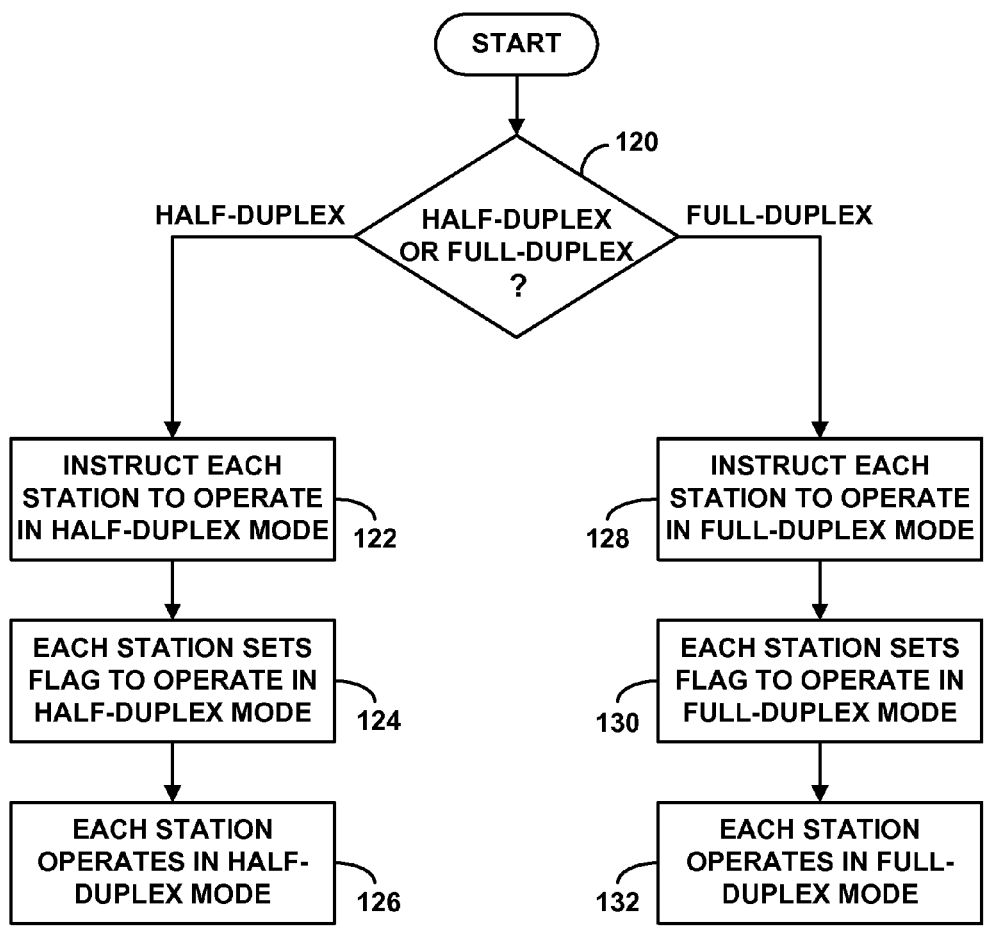
FIG. 12 is a flow chart depicting functions that can be carried out to selectively operate in either a half-duplex mode or a full-duplex mode in accordance with the exemplary embodiment.

In accordance with the exemplary embodiment, the communication server will selectively instruct participating stations to operate in either half-duplex mode or a full-duplex mode. FIG. 12 depicts an example of this process.

As shown in FIG. 12, at step 120, server 22 may determine at session initiation whether the session should operate in half-duplex mode or full-duplex mode. The server may make this decision when the server receives an initial session initiation request, such as a SIP INVITE from a participating station, or at some other time. And as noted above, the decision could be based on various factors, such as service levels, time/date and measures of network congestion.

If the server decides to proceed in half-duplex mode, then, at step 122, the server may instruct each participating station to operate in half-duplex mode, such as by sending a "half-duplex" instruction code in a SIP message to each station. In response, at step 124, each participating station may set a flag in its data storage 28 to indicate the half-duplex mode of operation. At step 126, each station may then proceed to operate in the half-duplex mode. For instance, if a station is equipped to engage in implicit floor control as noted above, the station would treat receipt of an incoming RTP stream as an implicit floor denial when the station is trying to take the floor, and the station might alert a user of the floor denial.

On the other hand, if the server decides to proceed in full-duplex mode, then, at step 128, the server may instruct each participating station to operate in full-duplex mode, such as by sending a "full-duplex" instruction code in a SIP message to each station. In response, at step 130, each station may set a flag in its data storage 28 to indicate the full-duplex mode of operation. At step 132, each station may then proceed to operate in the full-duplex mode. For instance, the station would allow concurrent sending of an outgoing RTP stream and receiving of an incoming RTP stream. Thus, even if the station is equipped to engage in implicit floor control as noted above, the station would not treat an incoming RTP stream as an implicit floor denial and the station would not alert a user of a floor denial.

g. Participant Control Over Mode

In the exemplary embodiment, a participating station could exert some control over the mode of the session. For instance, a participating station (e.g., the initiating station) could indicate a desired mode in the session setup signal that the station sends to the communication server (e.g., in a parameter within a SIP INVITE or SIP 200 OK message). The server may then responsively instruct some or all of the participating stations to operate in that mode.

h. User Station Capabilities

It is possible that certain stations might be capable of only operating in a half-duplex mode, while other stations might be capable of operating in both full-duplex and half-duplex mode. In accordance with the exemplary embodiment, a station may indicate its capability to the server within session setup signaling, such as in a SIP message for instance.

For a given session, the server may then instruct some of the stations to operate in a half-duplex mode and the server may instruct other stations to operate in a full-duplex mode. Alternatively, the server may instruct all of the stations to operate in a full-duplex mode, and any station that is only capable of half-duplex operation may nevertheless operate in a half-duplex mode.

In one embodiment, if any station participating in the session is only half-duplex capable, the server may instruct some or all participating stations to operate in half-duplex mode. In this regard, if a session is being conducted in full-duplex and a half-duplex capable station then joins the session, the server might responsively instruct some or all of the other participants to switch to half-duplex mode.

3. Conclusion

An exemplary embodiment of the present invention has been described above. Those skilled in the art will understand, however, that changes and modifications may be made to this embodiment without departing from the true scope and spirit of the present invention, which is defined by the claims.

What is claimed is:

1. A method comprising:
   during initiation of a real-time media session between a plurality of user stations via a communication server, at least one of the user stations receiving from the communication server an instruction directing the at least one user station to operate in a particular mode selected from the group consisting of half-duplex mode and full-duplex mode; and
   a given one of the user stations receiving the instruction and responsively operating in the particular mode during the real-time media session, wherein operating in the particular mode during the real-time media session comprises (a) receiving an incoming media stream from the communication server while sending an outgoing media stream to the communication server during the real-time media session, (b) treating the incoming media stream as a floor denial if the particular mode is half-duplex, and (c) playing out the incoming media stream if the particular mode is full-duplex.

2. The method of claim 1, wherein the particular mode is selected by the communication server.

3. The method of claim 1, wherein receiving the instruction comprises receiving the instruction within session setup signaling.

4. The method of claim 1, wherein treating the incoming media stream as a floor denial comprises:
   presenting a floor denial alert to a user in response to receipt of the incoming media stream.

5. The method of claim 4, wherein the alert comprises at least one of an audible alert, a visual alert and a vibratory alert.

* * * * *